United States Patent
Saitoh et al.

(10) Patent No.: US 9,732,453 B2
(45) Date of Patent: Aug. 15, 2017

(54) NONWOVEN FABRIC SHEET, AND EXTRACTION FILTER AND EXTRACTION BAG USING THE SAME

(71) Applicant: OHKI CO., LTD., Osaka-shi, Osaka (JP)

(72) Inventors: Mitsunori Saitoh, Osaka (JP); Masahiro Nakamuro, Osaka (JP); Naoko Yamaguchi, Osaka (JP)

(73) Assignee: OHKI CO., LTD., Osaka-shi (JP)

( * ) Notice: Subject to any disclaimer, the term of this patent is extended or adjusted under 35 U.S.C. 154(b) by 0 days.

(21) Appl. No.: 15/124,182

(22) PCT Filed: Mar. 25, 2015

(86) PCT No.: PCT/JP2015/059274
§ 371 (c)(1),
(2) Date: Sep. 7, 2016

(87) PCT Pub. No.: WO2015/147119
PCT Pub. Date: Oct. 1, 2015

(65) Prior Publication Data
US 2017/0016157 A1    Jan. 19, 2017

(30) Foreign Application Priority Data

Mar. 27, 2014    (JP) ................ 2014-066068

(51) Int. Cl.
*D04H 1/435*    (2012.01)
*D04H 1/4374*    (2012.01)
(Continued)

(52) U.S. Cl.
CPC ............ *D04H 1/435* (2013.01); *B01D 11/02* (2013.01); *B01D 29/111* (2013.01); *B01D 29/27* (2013.01);
(Continued)

(58) Field of Classification Search
CPC ...... D04H 1/435; D04H 1/4374; D04H 3/011; D04H 3/16; D04H 1/54; D04H 1/56;
(Continued)

(56) References Cited

U.S. PATENT DOCUMENTS

| 2006/0292954 A1 | 12/2006 | Suzuka et al. |
| 2010/0146921 A1 | 6/2010 | Takano et al. |
| 2013/0111861 A1 | 5/2013 | Sakamoto |

FOREIGN PATENT DOCUMENTS

| JP | 2002-336127 A | 11/2002 |
| JP | 2007-125546 A | 5/2007 |

(Continued)

OTHER PUBLICATIONS

Jun. 30, 2015 International Search Report issued in International Patent Application No. PCT/JP2015/059274.

*Primary Examiner* — Michael C Miggins
(74) *Attorney, Agent, or Firm* — Oliff PLC

(57) ABSTRACT

The present invention provides a nonwoven fabric sheet for use in extraction filters having high sealing strength and extraction filters manufactured using the nonwoven fabric sheet. The nonwoven fabric sheet includes a first layer including a spunbonded nonwoven fabric formed from a polyester-based resin having an IV value of 0.60 to 1.00, a crystallinity of 30% to 80%, a crystalline orientation of 60% to 95%, and a birefringence (Δn) of 0.040 to 0.100 and provided with a partial thermocompression bonding section whose thermocompression bonding area rate is in the range of 5% to 30%, and a second layer including a meltblown nonwoven fabric formed from a polyester-based resin blown onto a surface of the first layer and solidified to have a crystallinity of 0% to 14%. The extraction filters are formed by sealing by welding the nonwoven fabric sheet with the second layer of the sheet placed inside.

4 Claims, 2 Drawing Sheets

(51) Int. Cl.
   *D04H 3/011*   (2012.01)
   *D04H 3/16*    (2006.01)
   *B65D 85/808*  (2006.01)
   *D04H 1/54*    (2012.01)
   *D04H 1/56*    (2006.01)
   *D04H 3/14*    (2012.01)
   *B01D 11/02*   (2006.01)
   *B01D 29/11*   (2006.01)
   *B01D 29/27*   (2006.01)
   *B01D 39/16*   (2006.01)
   *B32B 1/02*    (2006.01)
   *B32B 5/02*    (2006.01)
   *B32B 5/26*    (2006.01)
   *B32B 7/02*    (2006.01)
   *B32B 7/04*    (2006.01)

(52) U.S. Cl.
   CPC ............. *B01D 39/163* (2013.01); *B32B 1/02* (2013.01); *B32B 5/022* (2013.01); *B32B 5/26* (2013.01); *B32B 7/02* (2013.01); *B32B 7/045* (2013.01); *B65D 85/808* (2013.01); *D04H 1/4374* (2013.01); *D04H 1/54* (2013.01); *D04H 1/56* (2013.01); *D04H 3/011* (2013.01); *D04H 3/14* (2013.01); *D04H 3/16* (2013.01); *B01D 2239/0622* (2013.01); *B01D 2239/0627* (2013.01); *B01D 2239/0672* (2013.01); *B01D 2239/1233* (2013.01); *B32B 2250/20* (2013.01); *B32B 2262/0276* (2013.01); *B32B 2307/726* (2013.01); *B32B 2439/46* (2013.01); *D10B 2505/04* (2013.01)

(58) Field of Classification Search
   CPC ........ D04H 3/14; B65D 85/808; B01D 11/02; B01D 29/111; B01D 29/27; B01D 39/163; B01D 2239/0622; B01D 2239/0627; B01D 2239/0672; B01D 2239/1233; B32B 1/02; B32B 5/022; B32B 5/26; B32B 7/02; B32B 7/045; B32B 2250/20; B32B 2262/0276; B32B 2307/726; B32B 2439/46; D10B 2505/04
   IPC .................................... B65D 85/808
   See application file for complete search history.

(56) References Cited

FOREIGN PATENT DOCUMENTS

| | | |
|---|---|---|
| JP | 2010-129486 A | 6/2010 |
| JP | 2011-157118 A | 8/2011 |
| JP | 2011-157661 A | 8/2011 |
| JP | 2012-017529 A | 1/2012 |
| JP | 2012-076042 A | 4/2012 |
| JP | 2015-074838 A | 4/2015 |
| JP | 2015-074842 A | 4/2015 |
| WO | 2004/094136 A1 | 11/2004 |

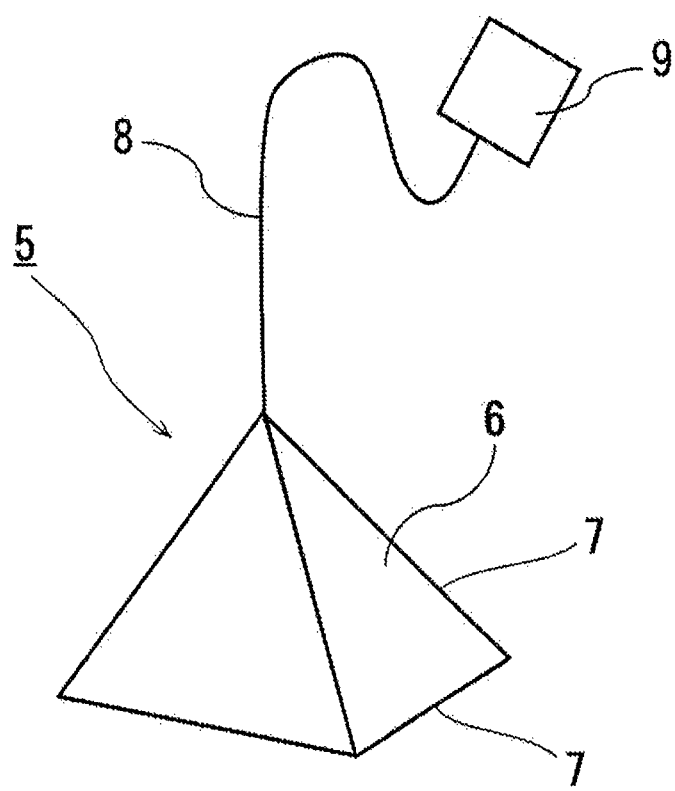

NONWOVEN FABRIC SHEET, AND EXTRACTION FILTER AND EXTRACTION BAG USING THE SAME

TECHNICAL FIELD

The present invention relates to a nonwoven fabric sheet, and an extraction filter and an extraction bag using the same as the material (hereinafter both the extraction filter and the extraction bag are referred to as "extraction filters"). The present invention more particularly relates to a nonwoven fabric sheet formed by laminating meltblown nonwoven fabrics onto a surface of spunbonded nonwoven fabrics, and extraction filters manufactured by, for example, cutting or sealing the nonwoven fabric sheet.

BACKGROUND ART

Nonwoven fabric sheets having two layers of a spunbonded nonwoven fabric and a meltblown nonwoven fabric are relatively durable and have good extraction performance in general. The nonwoven fabric sheets are thus suitable for the material of filters or bags for extraction and widely distributed. Examples of such filters and bags include drip bags sealingly filled with powder materials such as powder coffee, tea bags sealingly filled with tea leaves such as black tea and green tea, soup stock packs sealingly filled with chips of materials such as kelp and dried bonito, bathing bags sealingly filled with bath additive fragments, and drug bags sealingly filled with powdered decoction.

As forming machines and forming filling machines for manufacturing these extraction filters have been improved for high-speed operation with the progress of technology year by year, the needs of short-time sealing during the manufacturing of extraction filters by, for example, cutting and sealing nonwoven fabric sheets are increasing. Therefore, the development of nonwoven fabric sheets for extraction filters with adequate sealing strength in a short time is demanded.

For the nonwoven fabric sheets having two layers of a spunbonded nonwoven fabric and a meltblown nonwoven fabric, in order to obtain adequate sealing strength in a short time of sealing these two materials with the meltblown nonwoven fabric layer (sealing layer) placed inside, the meltblown nonwoven fabric layer requires that the fibers forming the meltblown nonwoven fabric is readily softened and fluidized by heating, and that the fluidized resin readily infiltrates into the space among fibers in the spunbonded nonwoven fabric and integrates with the same. In order to satisfy these conditions, the resin forming the meltblown nonwoven fabric must have a low softening point, and have adequate fluidity upon the melting. In contrast, the spunbonded nonwoven fabric needs to have thermal resistance capable of maintaining fiber form against heat and pressure upon the sealing. In order to achieve such characteristics, the resin forming the spunbonded nonwoven fabric must have an adequately higher softening point than that of the resin forming the meltblown nonwoven fabric, and therefore, the spunbonded nonwoven fabric must maintain the fabric form without deformation upon being exposed to such a high temperature that the meltblown nonwoven fabric will melt.

As used herein, the term "sealing strength" refers to the breaking strength of a sealing part formed by sealing two nonwoven fabrics in a welding manner.

There exist mainly three types of the nonwoven fabric sheets having two layers of a spunbonded nonwoven fabric and a meltblown nonwoven fabric. The first type is a nonwoven fabric sheet manufactured by independently preparing the spunbonded nonwoven fabric and the meltblown nonwoven fabric, and then overlaying one on the other and adhering to each other by partial thermocompression bonding or other processing (type A). The second type is a nonwoven fabric sheet manufactured by performing partial thermocompression bonding onto the spunbonded nonwoven fabric, and blowing a heat-melted resin in fibrous form onto a surface of the spunbonded nonwoven fabric to laminate the meltblown nonwoven fabric thereon (type B). The third type is a nonwoven fabric sheet manufactured by blowing a heat-melted resin in fibrous form onto a surface of a web-shaped spunbonded nonwoven fabric without partial thermocompression bonding to laminate the meltblown nonwoven fabric thereon (type C).

Because the nonwoven fabric sheet of type A is integrated together after one nonwoven fabric is overlaid on the other, they only adhere to each other partially by partial thermocompression bonding or other processing. The nonwoven fabric sheet of type A therefore has a low adhesive strength on an interface between the spunbonded nonwoven fabric and the meltblown nonwoven fabric, so that it may fail to obtain adequate sealing strength.

The nonwoven fabric sheet of type C employs the web-shaped spunbonded nonwoven fabric formed from fibers that do not adhere to each other. Thus, the nonwoven fabric sheet of type C has low tensile strength and easily break or deform, which makes it difficult to obtain high sealing strength.

In order to increase the tensile strength, it is contemplated that the nonwoven fabric sheet of type C is subjected to partial thermocompression bonding to cause the fibers in the spunbonded nonwoven fabric to adhere to each other after the lamination of the meltblown nonwoven fabric onto the surface of the spunbonded nonwoven fabric. In such a method, the laminated meltblown nonwoven fabric has a lower softening point than that of the spunbonded nonwoven fabric, which makes it difficult to control the temperature such that the spunbonded nonwoven fabric is softened to such an extend as to integrate together without excessive softening of the meltblown nonwoven fabric. Consequently, the partial thermocompression bonding for the nonwoven fabric sheet of type C is incomplete, and the nonwoven fabric sheet of type C will often fail to obtain adequate tensile strength.

In contrast, the nonwoven fabric sheet of type B is manufactured by previously performing partial thermocompression bonding onto the spunbonded nonwoven fabric to cause the fibers therein to partially adhere to each other and integrate together, and then blowing a heat-melted resin onto the surface of the spunbonded nonwoven fabric to laminate the meltblown nonwoven fabric thereon. The nonwoven fabric sheet of type B can therefore have high adhesive strength on the interface between the spunbonded nonwoven fabric and the meltblown nonwoven fabric, resulting in high sealing strength and high tensile strength.

The inventors of the present invention have selected the above-described nonwoven fabric sheet of type B as a target for development, and also have strived to develop a nonwoven fabric sheet having an adequate sealing strength in fast forming machines.

Patent Literature 1 discloses a drip-type package for filling beverage materials having a water-permeable bag body configured of an outer layer and an inner layer, the outer layer being a spunbonded nonwoven fabric containing 50% or more of polyolefin and the inner layer being a meltblown nonwoven fabric made of a polyolefin.

The package, however, employs the above-described nonwoven fabric sheet of type A manufactured by independently preparing the spunbonded nonwoven fabric and the meltblown nonwoven fabric, and then overlaying one on the other and adhering to each other. The package therefore has low adhesive strength on the interface between both nonwoven layers, so that it may fail to obtain adequate sealing strength.

Patent Literature 2 discloses a nonwoven fabric for filters in which a meltblown nonwoven fabric made of polybutylene terephthalate or polytrimethylene terephthalate fibers each having a fiber diameter of 1 to 8 μm is integrally laminated onto a spunbonded nonwoven fabric made of polyester-based fibers having a fiber diameter of 10 to 30 μm.

This nonwoven fabric for filters, however, is intended to improve dust collection performance, and the integration of the meltblown nonwoven fabric and the spunbonded nonwoven fabric is preferably achieved with partial thermocompression bonding by using a pair of hot emboss rolls and the like. This nonwoven fabric also falls within the category of the above-described type A. The nonwoven fabric also has a small difference in the melting point between the resin forming the meltblown nonwoven fabric and the resin forming the spunbonded nonwoven fabric, and thus may fail to obtain adequate sealing strength.

Patent Literature 3 discloses a filter for food having a laminate nonwoven fabric that is integrated by laminating a low-crystallinity superfine fiber nonwoven fabric layer formed by meltblowing on a long fiber nonwoven fabric layer formed by spunbonding, and then performing inline partial thermocompression bonding to integrate together.

This filter for food employs the above-described nonwoven fabric sheet of type C, and is manufactured by entangling superfine fibers with a web-shaped long-fiber nonwoven fabric in which long fibers do not adhere to each other, or are fixed, and then performing partial thermocompression bonding to adhere the long fibers to each other. This makes it difficult to control the temperature such that the super fine fibers are softened to such an extent as to adhere the long fibers to each other without excessive softening. Consequently, the partial thermocompression bonding for the filter for food is incomplete, and the filter may fail to obtain adequate tensile strength and therefore fail to have high sealing strength.

CITATION LIST

Patent Literature

[PTL 1] Japanese Patent Application Publication No. 2002-336127
[PTL-2] Japanese Patent Application Publication No. 2007-125546
[PTL-3] Japanese Patent Application Publication No. 2011-157118

SUMMARY OF INVENTION

Technical Problem

In view of foregoing, an object of the present invention is to provide a nonwoven fabric sheet having a high sealing strength even when sealed in a short time and adequately adapting to fast forming machines. The nonwoven fabric is used for the material of filters or bags for extraction. Another object of the present invention is to provide extraction filters having a high sealing strength manufactured by using the nonwoven fabric sheet.

Solution to Problem

According to the present invention, a first aspect for solving the above-described problems is a nonwoven fabric sheet including a first layer including a spunbonded nonwoven fabric formed from fibers of a polyester-based resin having an IV value of 0.60 to 1.00, a crystallinity of 30% to 80%, a crystalline orientation of 60% to 95%, and a birefringence ($\Delta n$) of 0.040 to 0.100 and provided with a partial thermocompression bonding section having a thermocompression bonding area rate of 5% to 30%, and a second layer including a meltblown nonwoven fabric formed from fibers of a polyester-based resin blown onto a surface of the first layer and solidified, the polyester-based resin of the fibers forming the meltblown nonwoven fabric having a crystallinity of 0% to 14%.

A second aspect for solving the above-described problems is the nonwoven fabric sheet of the first aspect, in which the spunbonded nonwoven fabric has a basis weight of 8.0 to 25.0 g/m$^2$ and a fiber diameter of 10 to 40 μm, and the meltblown nonwoven fabric has a basis weight of 2.0 to 10.0 g/m$^2$, and the nonwoven fabric sheet has a bulk density of 0.15 to 0.40 g/cm$^3$.

A third aspect for solving the above-described problems is an extraction filter formed by employing the nonwoven fabric sheet of the first aspect or the second aspect, and sealing by welding the nonwoven fabric sheet at a predetermined location with the second layer of the nonwoven fabric sheet placed inside.

A fourth aspect for solving the above-described problems is an extraction bag formed by employing the nonwoven fabric sheet of the first aspect or the second aspect, sealing by welding the nonwoven fabric sheet at a predetermined location with the second layer of the sheet placed inside to form a bag body in which an extraction material has been sealingly enclosed.

Advantageous Effects of Invention

When the nonwoven fabric sheet according to the present invention is sealed in a forming machine, the second layer is readily softened and fluidized by heating due to the low softening point of the polyester-based resin forming the meltblown nonwoven fabric. In contrast, the first layer can maintain fiber form without deformation upon being nipped and heated by a heat seal bar at a high temperature of about 160° C. to 180° C., for example, because the polyester-based resin forming the spunbonded nonwoven fabric has good thermal resistance.

Since heat on the sealing causes the resin of the meltblown nonwoven fabric to be fluidized and infiltrated into the space among fibers in the spunbonded nonwoven fabric, the nonwoven fabric sheet according to the present invention can obtain high sealing strength even when sealed in a short time.

That is, the nonwoven fabric sheet can obtain adequate sealing strength in a short time, providing an excellent machinability for fast forming machines. In addition, the nonwoven fabric sheet can be molded thinly owing to its appropriate rigidity, providing an excellent transparency and extraction performance.

Furthermore, the extraction filters according to the present invention have excellent shape retention upon the formation of the extraction filters in a three-dimensional shape by virtue of their appropriate rigidity. Since the first layer has an excellent shape retention at a high temperature, the extraction filters are not shrunken or deformed at sealed sections upon the sealing, which can result in products having attractive appearance.

Furthermore, the extraction bag can have a high sealing strength in spite of the manufacture in a fast forming machine. For example, when the extraction bags are pushed into containers and boxes after formed by sealingly enclosing an extraction material in the extraction bag, the extraction bags can withstand force, such as pressing force, thereby avoiding damage or deformation. Moreover, the extraction bag according to the present invention also has excellent extraction performance by virtue of its low boiling water shrinkage.

BRIEF DESCRIPTION OF DRAWINGS

FIG. 2 is a perspective view illustrating one embodiment of an extraction bag according to the present invention.

DESCRIPTION OF EMBODIMENTS

Figure 1:
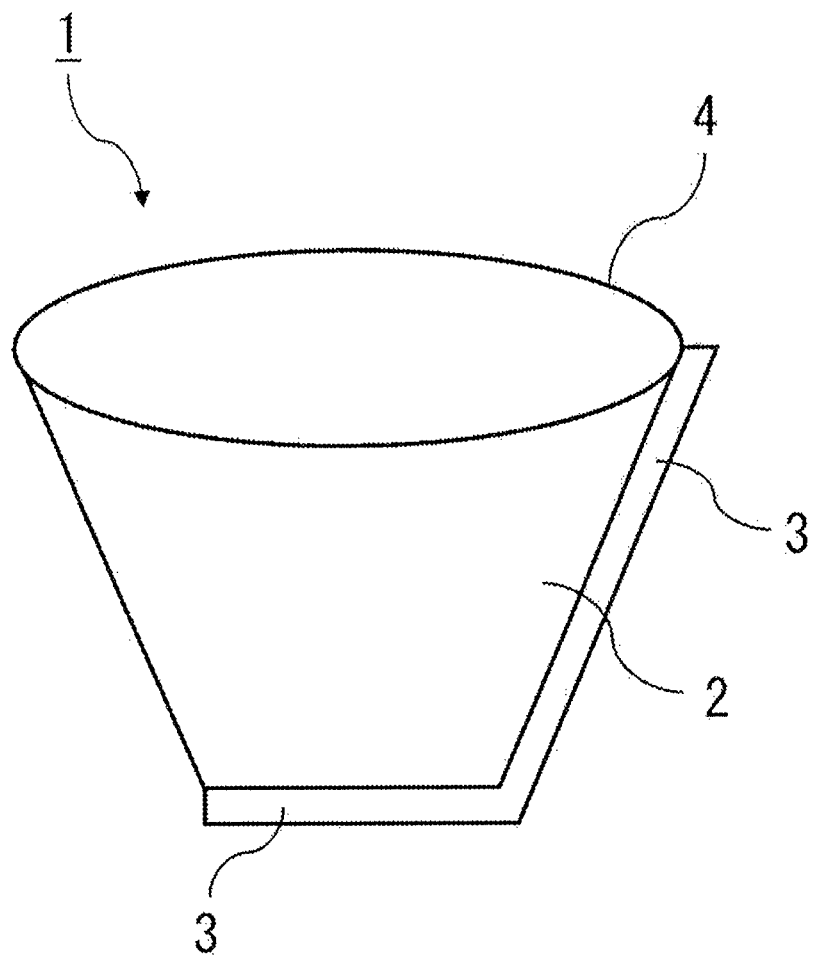
FIG. 1 is a perspective view illustrating one embodiment of an extraction filter according to the present invention.

An embodiment of the first aspect of the present invention will first be described.

The first aspect of the present invention is a nonwoven fabric sheet includes a first layer including a spunbonded nonwoven fabric formed from fibers of a polyester-based resin having an IV value of 0.60 to 1.00, a crystallinity of 30% to 80%, a crystalline orientation of 60% to 95%, and a birefringence ($\Delta n$) of 0.040 to 0.100 and provided with a partial thermocompression bonding section having a thermocompression bonding area rate of 5% to 30%, and a second layer including a meltblown nonwoven fabric formed from fibers of a polyester-based resin blown onto a surface of the first layer and solidified, the polyester-based resin of the fibers forming the meltblown nonwoven fabric having a crystallinity of 0% to 14%.

To manufacture the nonwoven fabric sheet by forming the second layer including the meltblown nonwoven fabric on the surface of the first layer including the spunbonded nonwoven fabric, the present invention follows the process of lamination forming the meltblown nonwoven fabric by extruding a heat-melted resin from a spinning nozzle in fibrous form, blowing an air stream at a high temperature onto these fibers to scatter, and blowing the scattered fibers onto the surface of the spunbonded nonwoven fabric to solidify the fibers. In the present invention, the crystallinity of the polyester-based resin forming the meltblown nonwoven fabric needs to be adjusted within the range of 0% to 14%.

The term "crystallinity" as used herein refers to, when the resin is partially crystallized, a ratio of the crystallized portions relative to the entire resin, and lower crystallinity generally tends to decrease the softening point.

In the present invention, the crystallinity of the polyester-based resin forming the meltblown nonwoven fabric in the second layer is adjusted within the range of 0% to 14%, which can lower the softening point of the resin to about 80° C. to 115° C. Thus, the resin can be readily softened and have high fluidity by heating upon the sealing.

To adjust the crystallinity of the polyester-based resin within the range of 0% to 14% as described above, a raw resin preferably has, for example, an IV value of about 0.30 to 0.80 and a relatively small molecular weight. In addition, the resin is desirably molten at a high temperature before spinning such that there are few crystallized portions. Furthermore, when the molten resin is extruded from the spinning nozzle in fibrous form and the air stream is blown, the advance of the crystallization of the resin can be suppressed by setting the temperature of the air stream at a high temperature of about 300° C. to 400° C.

In forming the meltblown nonwoven fabrics as described above, blowing the air stream at a high temperature of about 300° C. to 400° C. onto the molten resin in fibrous form enables the fiber surface of the meltblown nonwoven fabric to remain softened when the molten resin is blown onto the surface of the spunbonded nonwoven fabrics. Thus, the fibers of the meltblown nonwoven fabric can adhere to each other at many parts, and the fibers of the meltblown nonwoven fabric can adhere to the fibers of the spunbonded nonwoven fabric at many parts, resulting in the strong integration of both nonwoven fabrics.

Examples of the polyester-based resin forming the meltblown nonwoven fabric in the second layer include polyester-based resins such as linear polyesters and copolymerized polyesters. Preferably, for example, copolymers of polyethylene terephthalate/polyethylene isophthalate formed by adjusting the polymerization ratio of the acid components terephthalic acid/isophthalic acid in an appropriate range can be used. Preferably, resins can be used that are formed by polymerizing terephthalic acid as the main component, isophthalic acid, such as 5-sulfoisophthalic acid sodium, diethylene glycol, propylene glycol, 1,4-butanediol, pentaerythritol, 4-hydroxybenzoic acid, adipic acid, naphthalene dicarboxylic acid, phthalic acid, naphthalenecarboxylic acid, ethylene glycol and 1,4-butanediol in an appropriate ratio.

Resins containing a small amount of a matting agent including an inorganic metal oxide such as titanium oxide, magnesium stearate, and calcium stearate may be used as the resin forming the meltblown nonwoven fabric in general. Since the matting agent has an effect of accelerating the crystallization of the fibers, using the resin containing a small or no amount of the matting agent is effective for decreasing the crystallinity of the resin of the meltblown nonwoven fabric to a low level. Furthermore, both resins of the meltblown nonwoven fabric and the spunbonded nonwoven fabric preferably contain no matting agent in order to improve the transparency of the nonwoven fabric sheet according to the present invention.

Moreover, the second layer in the nonwoven fabric sheet according to the present invention, which is formed of the above-described meltblown nonwoven fabric, may be mixed with, aside from such a meltblown nonwoven fabric, nonwoven fabrics manufactured by other spinning methods and other materials as long as advantages of the present invention will not be impaired. The mixing ratio of other materials such as other nonwoven fabrics is preferably not more than 10% relative to the meltblown nonwoven fabric.

Next, the first layer of the nonwoven fabric sheet according to the present invention will be described.

The spunbonded nonwoven fabric forming the first layer is formed from fibers of the polyester-based resin having an IV value of 0.60 to 1.00, a crystallinity of 30% to 80%, a crystalline orientation of 60% to 95%, and a birefringence ($\Delta n$) of 0.040 to 0.100, and is subjected to partial thermocompression bonding such that the thermocompression bonding area rate is within the range of 5% to 30%.

The term "IV value" as used herein refers to an index indicating the molecular weight of the resin constituting the fibers. An increase in the IV value increases the molecular weight as well as the viscosity of the heat-molten resin accordingly. If the resin has an IV value less than 0.60, drawing the fibers sufficiently upon spinning is difficult, and the resins tends to shrink upon being exposed to a high temperature to decrease the softening point. Consequently, the spunbonded nonwoven fabric of the first layer may be shrunken and deformed by an air stream at such a high temperature at which the meltblown nonwoven fabric of the second layer can be laminated on the surface of the first layer, which fails to form a flat homogeneous nonwoven fabric sheet.

In contrast, if the resin has an IV value more than 1.00, the heat-molten resin has high viscosity such that it is difficult to extrude the resin from the spinning nozzle and to draw. This fails to form a homogeneous spunbonded nonwoven fabric.

The polyester-based resin forming the spunbonded nonwoven fabric of the first layer includes polyester-based resins such as linear polyesters and copolyesters. Polyester-based resins, such as polyethylene terephthalate and polybutylene terephthalate, having an IV value of 0.60 to 1.00 can be used.

The crystallinity, the crystalline orientation, and the birefringence of the polyester-based resin forming the spunbonded nonwoven fabric of the first layer indicate indices that show the fiber's characteristics. These indices are interrelated to each other. Setting the crystallinity to the range of 30% to 80%, the crystalline orientation to the range of 60% to 95%, and the birefringence ($\Delta n$) to the range of 0.040 to 0.100 can result in a spunbonded nonwoven fabric having such thermal resistance that prevents the spunbonded nonwoven fabric from deforming even when blown by the air stream at a high temperature of about 300° C. to 400° C., for example, and having excellent rigidity.

To manufacture such a spunbonded nonwoven fabric that has excellent thermal resistance and rigidity, the molten resin extruded from the spinning nozzle is preferably pulled as fast as possible and is sufficiently drawn. The preferred pulling speed is 3,500 m/min or more. When the fibers are pulled at a pulling speed less than 3,500 m/min, the fibers fail to be drawn well, which results in small fiber strength and low thermal resistance. Thus, the fibers tend to shrink.

In addition, the form of the fibers of such a spunbonded nonwoven fabric may be monofilament fibers, multifilament fibers, or conjugate fibers having a core-sheath structure in which two types of resins are combined. Furthermore, the cross-sectional shape of these fibers is not always round, but may be irregular shapes such as elliptical, triangular, and other polygonal shapes, and even hollow shapes.

The fibers drawn at the above-described appropriate pulling speed are collected as a web onto a collector such as a conveyor belt, and then subjected to partial thermocompression bonding to partially adhere to each other. The partial thermocompression bonding causes the spunbonded nonwoven fabric to increase its tensile strength, and also increase its rigidity by controlling the space among fibers therein within an appropriate range.

The thermocompression bonding area rate upon the partial thermocompression bonding is within the range of 5% to 30%. If the spunbonded nonwoven fabric has a thermocompression bonding area rate of less than 5%, bonding parts where the fibers adhere to each other decrease, and the spunbonded nonwoven fabric tends to have poor tensile strength and poor rigidity. In contrast, if the spunbonded nonwoven fabric has a thermocompression bonding area rate of more than 30%, there are excessive bonding parts where the fibers adhere to each other, which narrows the space among fibers in the spunbonded nonwoven fabric. The heat-molten resin of the meltblown nonwoven fabric hardly infiltrates into the space among fibers in the spunbonded nonwoven fabric upon the sealing of the nonwoven fabric sheet, and thus the sheet may fail to obtain adequate sealing strength. In addition, the nonwoven fabric sheet is readily clogged, and has impaired extraction performance.

For partial thermocompression bonding, for example, the spunbonded nonwoven fabric may be passed between a pair of rolls including an embossing roll having an uneven surface structure and a flat roll having a smooth surface to form a partial thermocompression bonding section dispersed throughout the spunbonded nonwoven fabric. In this case, the process for bonding the fibers together in the partial thermocompression bonding section may employ a process of heating the fibers with a heater to soften the resin, and a process of causing the fibers of the resin to generate heat by ultrasonic vibration to soften the fibers and adhere them to each other, for example.

In this way, the first layer, which is formed of the spunbonded nonwoven fabric, may be mixed with, aside from such a spunbonded nonwoven fabric, nonwoven fabrics manufactured by other spinning methods and other materials as long as the advantages of the present invention will not be impaired. The mixing ratio of other materials such as other nonwoven fabrics is preferably not more than 10% relative to the spunbonded nonwoven fabric.

The nonwoven fabric sheet according to the present invention is manufactured by the process including the step of preparing the spunbonded nonwoven fabric of the first layer, and the step of laminating the meltblown nonwoven fabric of the second layer onto the surface of the first layer as described above. Both of these steps may be performed separately or preferably performed sequentially by what is called an inline method to improve the manufacturing efficiency.

The thus manufactured nonwoven fabric sheet not only is not shrunken or deformed by the air stream at a high temperature of about 300° C. to 400° C. during the lamination of the meltblown nonwoven fabric owing to the high thermal resistance of the spunbonded nonwoven fabric, but also is almost not shrunken or deformed even when used, for example, as an extraction bag by being steeped and decocted in boiling water owing to a boiling water shrinkage of 3% or less of the nonwoven fabric sheet.

Furthermore, the nonwoven fabric sheet according to the present invention also has increased surface strength, wear resistance, and rub resistance, since the fibers forming the spunbonded nonwoven fabrics are drawn to increase the tensile strength and rigidity thereof. Consequently, for example, when such a nonwoven fabric sheet is used as the material for an extraction bag having a tag and a string temporarily attached onto the surface of a bag body, the bag body can almost not break upon the pull of the tag and the string apart.

For the nonwoven fabric sheet according to the present invention, the resin forming the meltblown nonwoven fabric of the second layer has a softening point as low as about 80° C. to 115° C., while the resin forming the spunbonded nonwoven fabric of the first layer has excellent thermal resistance. Consequently, when the nonwoven fabric sheet is sealed on a forming machine, the meltblown nonwoven fabric is readily softened and fluidized by heating, while the spunbonded nonwoven fabric can maintain its fiber form without deformation upon being clamped and heated with a heat seal bar at a high temperature of about 160° C. to 180°

C., for example. Consequently, the resin of meltblown nonwoven fabric fluidized by heating can readily infiltrate into the space among fibers in the spunbonded nonwoven fabric to bring about what is called "anchoring effect", and thus to obtain adequate sealing strength in a short time of sealing.

For this reason, even if the nonwoven fabric sheet according to the present invention is used as the material for extraction filters in a fast forming machine with high manufacturing capability, a rate of defective products with insufficient sealing strength is remarkably low, and therefore the nonwoven fabric sheet has excellent machinability.

Recently, forming machines for extraction filters have extremely increased in speed. For example, manufacturing capability of forming machines for sealing by heat sealing has increased up to 600 to 800 seals per minute. In addition, manufacturing capability of forming machines for sealing by ultrasonic vibration has increased up to about 200 to 400 seals per minute. Consequently, nonwoven fabric sheets as the material for extraction filters are required to have such machinability that can obtain high sealing strength in a shorter time.

Moreover, the nonwoven fabric sheet according to the present invention can obtain high sealing strength upon being sealed either by heat sealing or ultrasonic vibration.

The sealing strength of the nonwoven fabric sheet according to the present invention sealed by heat sealing is a tensile force required for separating from each other surface weld sections at which the second layers of two nonwoven fabric sheets are placed opposite and heat-sealed. The sealing strength of the nonwoven fabric sheet according to the present invention sealed by ultrasonic vibration is a tensile force required for separating from each other linear weld sections at which the second layers of two nonwoven fabric sheets are placed opposite, and linearly welded by ultrasonic vibration.

The nonwoven fabric sheet according to the present invention may be treated with thermal calendering, partial thermocompression bonding, and the like for controlling the thickness of the nonwoven fabric sheet within a certain range, or for suppressing fluffing on the surface of the meltblown nonwoven fabric of the second layer. These treatments may increase the crystallinity of the resin forming the meltblown nonwoven fabric, and care should be taken to limit the crystallinity of the resin of the meltblown nonwoven fabric to the range of 0% to 14% after these treatments.

Moreover, the water permeability of the nonwoven fabric sheet according to the present invention may be increased by addition of a hydrophilic agent, so that the nonwoven fabric sheet can more preferably be used for extraction filters.

In addition, the nonwoven fabric sheet according to the present invention may have three or more layers formed by further laminating any other nonwoven fabric or woven fabric thereon as long as the advantages of the present invention will not be impaired.

Next, an embodiment of the second aspect of the present invention will be described.

The second aspect according to the present invention is the nonwoven fabric sheet of the first aspect, in which the spunbonded nonwoven fabric of the first layer has a basis weight of 8.0 to 25.0 $g/m^2$ and a fiber diameter of 10 to 40 μm, and the meltblown nonwoven fabric of the second layer has a basis weight of 2.0 to 10.0 $g/m^2$, and in which the nonwoven fabric sheet has a bulk density of 0.15 to 0.40 $g/cm^3$.

According to the present invention, the spunbonded nonwoven fabric of the first layer preferably has a basis weight of 8.0 to 25.0 $g/m^2$. This is because when the spunbonded nonwoven fabric has a basis weight within such a range, the nonwoven fabric sheet has adequately high tensile strength. Thus, the nonwoven fabric sheet does not break or deform when extraction filters are manufactured on forming machines, which can obtain high sealing strength and much better machinability.

Preferably, the spunbonded nonwoven fabric of the first layer preferably has a fiber diameter of 10 to 40 μm. This is because when the spunbonded nonwoven fabric has a fiber diameter within such a range, the nonwoven fabric sheet can obtain adequate extraction performance for use in extraction filters. In addition, the space among fibers in the spunbonded nonwoven fabric becomes larger, and thus, more resin of the fluidized meltblown nonwoven fabric infiltrates into such space among fibers upon being sealed, which can obtain remarkably high sealing strength.

Furthermore, the meltblown nonwoven fabric of the second layer preferably has a basis weight of 2.0 to 10.0 $g/m^2$. This is because when the meltblown nonwoven fabric has a basis weight within such a range, more resin is fluidized upon being sealed, which can obtain high sealing strength in a short time. In addition, the nonwoven fabric sheet can obtain adequate extraction performance for use in extraction filters.

Moreover, the nonwoven fabric sheet according to the present invention preferably has a bulk density of 0.15 to 0.40 $g/cm^3$. The sealing strength is influenced primarily by the bulk density of the spunbonded nonwoven fabric of the second layer. It is difficult, however, to separate the first layer from the second layer for measuring the sealing strength, and thus the bulk density of the nonwoven fabric sheet after laminating is specified. The spunbonded nonwoven fabric desirably maintains adequate space among fibers, and the thickness of the nonwoven fabric sheet is increased by maintaining the bulk density to a low level, which can provide the nonwoven fabric sheet with "stiffness" and obtain good machinability. Thus, the bulk density is preferably 0.40 $g/cm^3$ or less. Although the lower bulk density is preferred in that the sealing strength is increased and the rigidity is enhanced, it is difficult to manufacture a nonwoven fabric sheet having a bulk density below 0.15 $g/cm^3$.

The nonwoven fabric sheet according to the second aspect of the present invention has quite excellent machinability in that the nonwoven fabric sheet can obtain high sealing strength in a shorter time in fast forming machines when used for manufacturing extraction filters.

Moreover, since the nonwoven fabric sheet has high tensile strength and high rigidity, a continuous elongated nonwoven fabric sheet, for example, hardly causes such problems as swaying left and right while a fast forming machine conveys the same.

Furthermore, when extraction bags manufactured using the nonwoven fabric sheet are each individually packaged in external bags by a packaging machine, the extraction bags receive pressing force upon being pressed into the external bags. The extraction bags, however, having adequately high sealing strength hardly cause such problems as detachment or breakage at the sealing part.

Next, an embodiment of the third aspect according to the present invention, that is, an embodiment in which an extraction filter is manufactured with the nonwoven fabric sheet according to the first or second aspect of the present invention will be described with reference to FIG. 1.

An extraction filter 1 is a drip coffee filter that is set and used in a funnel-shaped dripper (not illustrated). The extraction filter 1 includes a substantially inverted trapezoidal filter section 2 having the second layer of the above-described nonwoven fabric sheet placed inside, a surface weld section 3 provided at the base and the side of the filter section 2, and an upper edge 4. In use, the upper edge 4 of the filter is opened so as to form into cone-shape, ground coffee is put through the open upper edge 4, and then hot water is poured from above and seeped to extract the coffee beverage.

The extraction filter 1 may be manufactured by using the above-described nonwoven fabric sheet that is continuous and elongated, for example, as an original fabric, and cutting and surface-welding into a predetermined shape by a fast forming machine.

The surface welding can be performed by compressing and heating the location to be welded of the nonwoven fabric sheet with a heat seal bar, and melting only the meltblown nonwoven fabric of the second layer having a low softening point to function as an adhesive, without softening the spunbonded nonwoven fabric of the first layer having excellent thermal resistance.

In addition, other sealing methods may be employed, such as welding by ultrasonic vibration, and fusion sealing in which the cutting and welding of the extraction sheet are simultaneously performed.

Since the manufactured extraction filter 1 has the filter section 2 constituted of the first layer in the nonwoven fabric sheet that has excellent form retention at a high temperature, no shrinkage or deformation is observed in the surface weld section 3 formed by the above-described heat-sealing. Thus, the extraction filter 1 is a product that has high sealing strength and attractive appearance.

In addition, the extraction filter 1 has excellent shape retention owing to its filter section 2 constituted of the nonwoven fabric sheet having appropriate rigidity, and can arrange and retain the shape with the upper edge 4 wide open as illustrated in FIG. 1.

In addition, the shape of the extraction filter 1 is not limited to the substantially inverted trapezoidal shape as illustrated in FIG. 1, but may be any shape such as substantially inverted triangular or disk shape. Moreover, its size and its use method are not limited.

Next, an embodiment of the fourth aspect according to the present invention, that is, an embodiment in which an extraction bag is manufactured with the nonwoven fabric sheet according to the first or second aspect of the present invention will be described with reference to FIG. 2.

An extraction bag 5 is a product generally referred to as tea bag, and includes a bag body 6 formed of the above-described nonwoven fabric sheet into a tetrahedral shape, a tag 9 for picking up the extraction bag 5 with one's fingertips in use, and a string 8 having one end adhered to the top end of the bag body 6 and the other end adhered to the tag 9. The bag body 6 is pouched by placing the second layer in the nonwoven fabric sheet inside, and forming linear weld sections 7 at the edge of each side by ultrasonic vibration, and is sealingly filled with dried black tea leaves as an extraction material (not illustrated) therein.

When the extraction bag 5 is used, for example, the tag 9 is held with one's fingertips, the bag body 6 is steeped in a cup containing hot water for several seconds to several minutes, and thus the dried tea leaves in the bag body 6 are reconstituted in hot water to elute black tea components.

The bag body 6 is manufactured, for example, in a fast forming filling machine by using the above-described nonwoven fabric sheet that is continuous and elongated as an original fabric and cutting and linear-welding the sheet to form the bag body 6 in which dried tea leaves are sealingly enclosed. Then, the linear welding of the bag body 6 can be performed by applying vibration to the location to be welded of the nonwoven fabric sheet by ultrasonic waves to generate heat, and melting only the meltblown nonwoven fabric of the second layer having low softening point to function as an adhesive, without softening the spunbonded nonwoven fabric of the first layer having excellent thermal resistance.

In addition, other sealing methods may be employed, such as surface welding by clamping with a heat seal bar, and fusion sealing in which the cutting and welding of the extraction sheet are simultaneously performed.

Since the first layer of the nonwoven fabric sheet constituting the bag body 6 has excellent form retention at a high temperature, no shrinkage or deformation is observed in the linear weld sections 7 formed by the above-described ultrasonic vibration. Thus, the bag body 6 is a product that has high sealing strength and attractive appearance.

Moreover, the bag body 6 has a low boiling water shrinkage owing to the excellent form retention of the first layer of the nonwoven fabric sheet, and thus does not cause such problems as the deformation of the bag body 6 upon steeping the extraction bag 5 in boiling water for a long time.

Furthermore, the bag body 6 has excellent shape retention owing to the appropriate rigidity of the nonwoven fabric sheet, and can maintain a beautiful tetra-shape in which each side extends linearly as illustrated in FIG. 2.

In addition, the shape of the bag body 6 is not limited to the tetra-shape, but can be any shape such as pillow-, pyramid-, disk- or stick-shape. Moreover, its size, capacity, and use method are not limited. Furthermore, the string 8 and the tag 9 may be temporarily adhered to the surface of the bag body 6 with such strength that they can be readily separated therefrom in use.

Preferably, the extraction bags 5 after manufactured are sealingly enclosed one by one or in groups in external bags or external containers (not illustrated) each made of resin film, paper and the like in order to retain the flavor of the dried tea leaves in the bag body 6 and prevent fouling.

In this way, when the extraction bags 5 are sealingly enclosed in external bags and the like, a packaging machine exerts pressing force on the extraction bags 5. The bag body 6, which includes the linear weld sections 7 having high sealing strength, does not almost cause the linear weld sections 7 to be pulled apart and broken.

EXAMPLES

The present invention will now be described in greater detail with reference to examples, but the present invention should not be limited to these examples.

First, test methods for individual indices according to the present invention will be described.

(1) Basis Weight ($g/m^2$)

Test pieces having a size of 10 cm square were sampled from a nonwoven fabric to be tested in accordance with JIS L-1906, and then the weights of the test pieces were measured to calculate the basis weight.

(2) Thickness (mm)

The thickness was measured in accordance with JIS L-1906 with a load of 100 $g/cm^2$ applied onto the surface of the nonwoven fabric.

(3) Bulk Density ($g/cm^3$)

The weight per unit volume was determined according to the following formula from the basis weight and the thickness measured by the above described methods (1) and (2).

Bulk density ($g/cm^3$)=Basis weight ($g/m^2$)/(Thickness (mm)×1000)

(4) Crystallinity (%)

Test pieces were sampled from the nonwoven fabric to be tested. Each of the test pieces was placed in a differential scanning calorimeter configured to increase a temperature at a rising rate of 10° C./min. ranging from 30° C. up to 240° C. to measure crystallization heat ΔHc and crystalline melting heat ΔHm. Crystallinity was calculated according to the following formula, where the formula, the numerical value "140.1" represents perfect crystal melting heat of polyester (in J/g).

$$\text{Crystallinity } \chi c(\%) = (\Delta Hm - \Delta Hc)/140.1 \times 100$$

(5) IV Value

The IV value was measured in accordance with JIS K7390.

(6) Crystalline Orientation (%)

Using a crystalline orientation X-ray diffractometer, a diffraction intensity curve was drawn from 7° to 35° at a diffraction angle 2θ on a sample having its thickness adjusted to about 0.5 mm under conditions of 30 KV, 80 A, a scanning speed of 1 degree/min., a chart speed of 10 mm/min., a time constant of 1 second, and a receiving slit of 0.3 mm. The reflections drawn at 2θ=16° and 22° represented the plane (010) and the plane (110), respectively. Furthermore, another diffraction intensity curve for the plane (110) was drawn in the direction from −180° to +180°. A mean value of the other diffraction intensity curves obtained at ±180° was found and a horizontal line as a base line was drawn. Perpendicular lines were drawn from the tops of the peaks toward the base line to find the midpoint of the heights of the peaks. A horizontal line was drawn through the midpoint, and a distance between the two intersecting points of the other diffraction intensity curve with the horizontal line through the midpoint was measured. This value was converted into an angle, which was referred to as an orientation angle H. The crystalline orientation was obtained by the following formula:

$$\text{Crystalline orientation } (\%) = (180 - H) \times 100/180$$

(7) Birefringence (Δn)

Fibers were sampled from a part that was not treated with partial thermocompression bonding in the spunbonded nonwoven fabric to be tested. Using an Olympus BH-2 polarizing microscope compensator, the birefringence was determined by typical interference fringes from the retardation and fiber diameter.

(8) Fiber Diameter (μm)

The diameters were measured at 10 locations for the fibers to be tested by visual inspection using an optical microscope. A mean value of the diameters was found. In addition, if fibers had a cross-sectional shape other than a round shape, the fiber diameter was obtained by virtually converting the cross-sectional shape to a round shape while maintaining its dimension.

(9) Softening Point (° C.)

Test pieces were sampled from the nonwoven fabric to be tested. Each of the test pieces was rested on a temperature rising section of a melting point measurement apparatus (AS ONE Corporation, ATM-01), and pressed with a metal spatula while gradually increased the temperature from ordinary temperature. The temperature at which softening of the test piece was observed by visual observation represented the softening point.

(10) Tensile Strength (N/15 mm)

Along the longitudinal direction of an elongated nonwoven fabric sheet continuously manufactured (the flow direction in the manufacture), ten test pieces with a length of 150 mm and a width of 15 mm were prepared. Each of the test pieces was pulled at a speed of 100 mm/min. by a Little Senstar from JT Tohsi Inc. to measure the strength, and a mean value of the measured values for 10 test pieces represented the tensile strength.

(11) Machinability (Heat Sealing Machine 1)

Machinability was evaluated by operating a fast forming filling machine (Series RF product from Topack Co., Ltd.: filling capacity 600 bags/min.) for 30 minutes, and counting the number of defective products. Specifically, the extraction bags were manufactured by preparing an elongated nonwoven fabric sheet with a width of 160 mm (a test object), and forming the sheet into pillow-shaped bags, with a dimension of 80 mm×100 mm, filled with green tea leaves (including powdered green tea) of 3 g per bag. The nonwoven fabric sheet was determined to be "appropriate" in such cases that the rate of defective products (hereinafter, also referred to as "defective rate") was less than 1% and no other troubles occurred, and otherwise determined to be "inappropriate".

(12) Machinability (Heat Sealing Machine 2)

Machinability was evaluated by operating a fast forming filling machine (Series RF product from Topack Co., Ltd.: filling capacity 800 bags/min.) for 30 minutes, and counting the number of defective products. Specifically, the extraction bags were manufactured by preparing an elongated nonwoven fabric sheet with a width of 160 mm (a test object), and forming the sheet into pillow-shaped bags, with a dimension of 80 mm×100 mm, filled with green tea leaves (including powdered green tea) of 3 g per bag. The nonwoven fabric sheet was determined to be "appropriate" in such cases that the defective rate was less than 1% and no other troubles occurred, and otherwise determined to be "inappropriate".

(13) Machinability (Ultrasonic Sealing Machine)

Machinability was evaluated by operating a fast forming filling machine (TWINKLE from Tsubakimoto Kogyo Co., Ltd.: filling capacity 200 bags/min.) for 60 minutes, and counting the number of defective products. Specifically, the extraction bags were manufactured by preparing an elongated nonwoven fabric sheet with a width of 120 mm (a test object), and forming the sheet into tetrahedral-shaped bags, which had 50 mm side and were respectively provided with a string and a tag temporarily adhered on a surface of each bag, filled with the black tea leaves by the CTC production method at 2 g per bag. The nonwoven fabric sheet was determined to be "appropriate" in such cases that the defective rate was less than 1% and no other troubles occurred, and otherwise determined to be "inappropriate".

(14) Sealing Strength

From extraction bags manufactured by the fast forming filling machine as described in (11), (12), and (13), 20 extraction bags each were randomly sampled as test objects, and measured for breaking strength at the sealing parts. A mean value of the 20 measured values was calculated. As to pillow-shaped extraction bags with a dimension of 80 mm×100 mm manufactured by the fast forming filling machines as described in (11) and (12) above, both ends of the shorter side of the extraction bag were cut off at 25 mm in length to make a test piece with a width of 30 mm. Breaking strength of the sealing part (the surface weld section) of the test piece was measured. Moreover, after cutting open extraction bags in a tetrahedral shape 50 mm on a side manufactured by the forming filling machine as described in (13) above, both ends of one sealing part (the linear weld section) of the cut extraction bag were cut off at 10 mm in length to make a test piece with a width of 30 mm. Breaking strength of the sealing part of the test piece was measured.

(15) Filling Suitability

Filling suitability was evaluated by operating a fast forming filling machine (TWINKLE from Tsubakimoto Kogyo Co., Ltd.: filling capacity 200 bags/min.) for one hour, and counting the number of defective products. Specifically, after making extraction bags in a tetrahedral shape by (13) described above, the extraction bags each were pressed into a film bag manufactured by folding the center of a PET/PET vapor deposition/PE film with a width of 180 mm at a pitch of 90 mm, and being hermetically sealed to manufacture individual packages. Then, the film bag was opened to examine the status of the defective products whose sealing parts of the extraction bags was broken upon the filling of the film bag. When no breakage was observed in all the extraction bags, filling suitability was determined to be "no problem".

(16) Extraction Performance

The nonwoven fabric sheet to be tested was used to make, by the forming filling machine in (13) described above, an extraction bag including a bag body in a tetrahedral shape 50 mm on a side and filled with 2 g of black tea leaves by the CTC production method. This extraction bag was steeped in hot water at 95° C. for three minutes, and then the extraction status of black tea was evaluated by visual observation. When a moderate density of black tea was obtained, extraction performance was determined to be "good", and when only light black tea, which was insufficient for beverage, was obtained, extraction performance was determined to be "light".

Example 1

A spunbonded nonwoven fabric of the first layer was prepared as follows: By the spunbond method, a polyethylene terephthalate resin was heat-molten to spin from a spinneret having a diameter of 0.3 mm, drawn and opened by an ejector at a spinning speed of 5,000 m/min., and collected on a conveyor belt to obtain a web. This web was subjected to partial thermocompression bonding at the thermocompression bonding area rate of 15% to obtain the spunbonded nonwoven fabric of the first layer. The prepared spunbonded nonwoven fabric had a basis weight of 12.0 g/m$^2$ and a fiber diameter of 13.6 μm, and its resin had an IV value of 0.71, a crystallinity of 71%, a crystalline orientation of 85%, and a birefringence (Δn) of 0.080.

Next, a polyester resin having a polymerization ratio of the acid components terephthalic acid/isophthalic acid of 86/14 was used to the resin of the meltblown nonwoven fabric. The meltblown nonwoven fabric of the second layer having a basis weight of 6 g/m$^2$ is laminated onto the surface of the spunbonded nonwoven fabric, at the air stream temperature set at 370° C. with the distance between the spinneret and the surface of the spunbonded nonwoven fabric (DCD) adjusted to 30 mm, and thus the nonwoven fabric sheet was prepared. The resin of the meltblown nonwoven fabric had a crystallinity of 0.4%.

Evaluation results by the above-described respective tests conducted for the resultant nonwoven fabric sheet of this example are listed in the column "Sample 1" in Table 1 below.

Test Example 1

Resins of a polyethylene terephthalate/polyethylene isophthalate copolymer having the polymerization ratio of the acid components terephthalic acid/isophthalic acid varied, and having a crystallinity adjusted into five stages of 3.0%, 10.0%, 14.0%, 15.0%, and 23.0% each were laminated onto the surface of the spunbonded nonwoven fabric of the first layer prepared under the same conditions as in Example 1 by the meltblown method under the same conditions as in Example 1 to form the meltblown nonwoven fabric of the second layer, and samples of the five nonwoven fabric sheets were prepared.

Evaluation results by the above-described respective tests conducted for the five resultant nonwoven fabric sheets of this example were listed in the columns "Sample 2" to "Sample 6" in Table 1 below.

TABLE 1

| | | | | Sample 1 | Sample 2 | Sample 3 | Sample 4 | Sample 5 | Sample 6 |
|---|---|---|---|---|---|---|---|---|---|
| First Layer Spunbouded Nonwoven Fabric | Production Conditions | Basis Weight | g/m$^2$ | 12 | 12 | 12 | 12 | 12 | 12 |
| | | Fiber Diameter | μm | 13.6 | 13.6 | 13.6 | 13.6 | 13.6 | 13.6 |
| | Physical Properties | IV Value | | 0.71 | 0.71 | 0.71 | 0.71 | 0.71 | 0.71 |
| | | Crystallinity | % | 71 | 71 | 71 | 71 | 71 | 71 |
| | | Crystalline Orientation | % | 85 | 85 | 85 | 85 | 85 | 85 |
| | | Birefringence (Δn) | | 0.08 | 0.08 | 0.08 | 0.08 | 0.08 | 0.08 |
| Second Layer Meltblown Nonwoven Fabric | Production Conditions | Basis Weight | g/m$^2$ | 6 | 6 | 6 | 6 | 6 | 6 |
| | | Air stream Temperature | ° C. | 370 | 370 | 370 | 370 | 370 | 370 |
| | | DCD | mm | 30 | 30 | 30 | 30 | 30 | 30 |
| | Physical Properties | Crystallinity | % | 0.4 | 3.0 | 10.0 | 14.0 | 15.0 | 23.0 |
| | | Softening Point | ° C. | 80 | 85 | 95 | 115 | 120 | 120 |
| Nonwoven Fabric Sheet | Physical Properties | Basis Weight | g/m$^2$ | 18 | 18 | 18 | 18 | 18 | 18 |
| | | Thickness | mm | 100 | 100 | 100 | 100 | 100 | 100 |
| | | Bulk Density | g/cm$^2$ | 0.174 | 0.174 | 0.174 | 0.174 | 0.174 | 0.174 |
| | | Tensile Strength | N/15 mm | 18.5 | 18.5 | 18.5 | 16.9 | 16.9 | 15.8 |
| | Machinability | Heat Sealing Machine 1 | Defective Rate | 0.2 | 0.3 | 0.3 | 0.6 | 1.1 | 1.3 |
| | | | Evaluation | appropriate | appropriate | appropriate | appropriate | inappropriate | inappropriate |
| | | | Sealing Strength | 15.9 | 15.8 | 15.5 | 15.5 | 15.2 | 14.9 |
| | | Heat Sealing Machine 2 | Defective Rate | 0.1 | 0.3 | 0.3 | 0.6 | 1.2 | 1.5 |
| | | | Evaluation | appropriate | appropriate | appropriate | appropriate | inappropriate | inappropriate |
| | | | Sealing Strength | 15.2 | 15.3 | 15.1 | 15.2 | 14.8 | 14.6 |
| | | Ultrasonic Sealing Machine | Defective Rate | 0.3 | 0.3 | 0.5 | 0.9 | 5.2 | 10.2 |
| | | | Evaluation | appropriate | appropriate | appropriate | appropriate | inappropriate | inappropriate |
| | | | Sealing Strength | 17.3 | 17.0 | 16.5 | 13.8 | 11.2 | 9.8 |
| | | Filling Suitability | Evaluation | no problem | no problem | no problem | no problem | problem found | problem found |
| | | Extraction performance | Evaluation | good | good | good | good | good | good |

Evaluation results for each sample listed in Table 1 revealed that the nonwoven fabric sheets (Samples 1 to 4) formed by laminating the meltblown nonwoven fabrics with the resins having a crystallinity within the range of 0.4% to 14.0% onto the surfaces of the spunbonded nonwoven fabrics prepared under fixed conditions caused no problems with either operation of the heat sealing-type fast forming filling machines and the ultrasonic sealing-type fast forming filling machines, and had good machinability.

In contrast, the nonwoven fabric sheets (Samples 5 and 6) formed by laminating the meltblown nonwoven fabrics with the resins having a crystallinity beyond 14.0% had low sealing strength, and thus caused such problems as breakage of the sealing parts.

All the extraction bags made of the nonwoven fabric sheets of Samples 1 to 6 had good extraction performance.

Test Example 2

The IV value of the polyethylene terephthalate resin, which was the raw material for the spunbonded nonwoven fabric of the first layer, and pulling conditions upon fiber spinning were altered, and then six spunbonded nonwoven fabrics were prepared as listed in Table 2 below. The meltblown nonwoven fabric of the second layer was laminated onto the surfaces of these spunbonded nonwoven fabrics under the same conditions as in Example 1, and samples of the six nonwoven fabric sheets were prepared.

Evaluation results by the above-described respective tests conducted for the six resultant nonwoven fabric sheets of this example were listed in the columns "Sample 7" to "Sample 12" in Table 2 below.

Discussions on evaluation results for "Sample 7" to "Sample 12" listed in Table 2 above revealed that the nonwoven fabric sheets (Samples 7 to 10) formed by laminating the meltblown nonwoven fabric with the resin having a crystallinity of 3.0% onto the surfaces of the spunbonded nonwoven fabrics having the IV value of the resin of 0.60 to 1.00, a crystallinity of 30% to 80%, a crystalline orientation of 60% to 95%, and a birefringence (Δn) of 0.040 to 0.100 caused no problems with either operation of the heat sealing-type fast forming filling machines and the ultrasonic sealing-type fast forming filling machines, and had good machinability.

In contrast, if the spunbonded nonwoven fabrics did not satisfy any one of the conditions of the IV value of 0.60 to 1.00, the crystallinity of 30% to 80%, the crystalline orientation of 60% to 95%, or the birefringence (Δn) of 0.040 to 0.100, the nonwoven fabric sheet was deformed at the step of laminating the meltblown nonwoven fabric layer onto the surfaces of the spunbonded nonwoven fabrics (Samples 11 and 12).

Test Example 3

For the spunbonded nonwoven fabric of the first layer, the IV value of the polyethylene terephthalate resin was set at 0.71, the crystallinity at 71%, the crystalline orientation at 85%, and the birefringence (Δn) at 0.080, and the fiber diameter was set at 13.6 μm, and the basis weight was altered in four stages from 7 to 27 g/m² as listed in Table 3 below. These four spunbonded nonwoven fabrics were prepared. The meltblown nonwoven fabric of the second layer

TABLE 2

| | | | | Sample 7 | Sample 8 | Sample 9 | Sample 10 | Sample 11 | Sample 12 |
|---|---|---|---|---|---|---|---|---|---|
| First Layer Spunbonded Nonwoven Fabric | Production Conditions | Basis Weight | g/m² | 12 | 12 | 12 | 12 | 12 | 12 |
| | | Fiber Diameter | μm | 13.6 | 13.6 | 13.6 | 13.6 | 13.6 | 13.6 |
| | Physical Properties | IV Value | | 0.6 | 0.95 | 0.71 | 0.71 | 0.59 | 0.71 |
| | | Crystallinity | % | 62 | 75 | 30 | 80 | 60 | 28 |
| | | Crystalline Orientation | % | 83 | 86 | 60 | 95 | 59 | 53 |
| | | Birefringence (Δn) | | 0.07 | 0.09 | 0.04 | 0.1 | 0.04 | 0.035 |
| Second Layer Meltblown Nonwoven Fabric | Production Conditions | Basis Weight | g/m² | 6 | 6 | 6 | 6 | 6 | 6 |
| | | Air stream Temperature | °C. | 370 | 370 | 370 | 370 | 370 | 370 |
| | | DCD | mm | 30 | 30 | 30 | 30 | 30 | 30 |
| | Physical Properties | Crystallinity | % | 3.0 | 3.0 | 3.0 | 3.0 | 3.0 | 3.0 |
| | | Softening Point | °C. | 85 | 85 | 85 | 85 | 85 | 85 |
| Nonwoven Fabric Sheet | Physical Properties | Basis Weight | g/m² | 18 | 18 | 18 | 18 | the first layer deformed upon forming the second layer | the first layer deformed upon forming the second layer |
| | | Thickness | mm | 100 | 95 | 95 | 100 | | |
| | | Bulk Density | g/cm³ | 0.174 | 0.189 | 0.189 | 0.180 | | |
| | | Tensile Strength | N/15 mm | 16.7 | 17.5 | 15.9 | 19.7 | | |
| | Machinability | Heat Sealing Machine 1 | Defective Rate | 0.7 | 0.2 | 0.8 | 0.1 | | |
| | | | Evaluation | appropriate | appropriate | appropriate | appropriate | | |
| | | | Sealing Strength | 15.4 | 15.7 | 15.3 | 15.8 | | |
| | | Heat Sealing Machine 2 | Defective Rate | 0.7 | 0.3 | 0.9 | 0.2 | | |
| | | | Evaluation | appropriate | appropriate | appropriate | appropriate | | |
| | | | Sealing Strength | 15.1 | 15.2 | 15.0 | 15.3 | | |
| | | Ultrasonic Sealing Machine | Defective Rate | 0.8 | 0.2 | 0.4 | 0.2 | | |
| | | | Evaluation | appropriate | appropriate | appropriate | appropriate | | |
| | | | Sealing Strength | 17.2 | 16.8 | 16.9 | 15.7 | | |
| | | Filling Suitability | Evaluation | no problem | no problem | no problem | no problem | | |
| | | Extraction performance | Evaluation | good | good | good | good | | | was laminated onto the surfaces of the four spunbonded nonwoven fabrics under the same conditions as in Example 1 to prepare four nonwoven fabric sheets of "Sample 13" to "Sample 16".

Moreover, five spunbonded nonwoven fabrics were prepared by using a polyethylene terephthalate resin having an IV value of 0.71, and altering the pulling speed to alter the fiber diameter in five stages from 9 to 42 μm as listed in Table 3. Then, the meltblown nonwoven fabric of the second layer was laminated onto the surfaces of the five spunbonded nonwoven fabrics under the same conditions as in Example 1 to prepare five nonwoven fabric sheets of "Sample 17" to "Sample 21".

Evaluation results by the above-described respective tests conducted for the nine resultant nonwoven fabric sheets of this example were listed in the columns "Sample 13" to "Sample 21" in Table 3 below.

TABLE 3

|  |  |  |  | Sample 13 | Sample 14 | Sample 15 | Sample 16 | Sample 17 |
|---|---|---|---|---|---|---|---|---|
| First Layer Spunbonded Nonwoven Fabric | Production Conditions | Basis Weight | g/m² | 7 | 8 | 25 | 27 | 12 |
|  |  | Fiber Diameter | μm | 13.6 | 13.6 | 13.6 | 13.6 | 9 |
|  | Physical Properties | IV Value |  | 0.71 | 0.71 | 0.71 | 0.71 | 0.71 |
|  |  | Crystallinity | % | 71 | 71 | 71 | 71 | 79 |
|  |  | Crystalline Orientation | % | 85 | 85 | 85 | 85 | 89 |
|  |  | Birefringence (Δn) |  | 0.08 | 0.08 | 0.08 | 0.08 | 0.1 |
| Second Layer Meltblown Nonwoven Fabric | Production Conditions | Basis Weight | g/m² | 6 | 6 | 6 | 6 | 6 |
|  |  | Air stream Temperature | °C. | 370 | 370 | 370 | 370 | 370 |
|  |  | DCD | mm | 30 | 30 | 30 | 30 | 30 |
|  | Physical Properties | Crystallinity | % | 3.0 | 3.0 | 3.0 | 3.0 | 3.0 |
|  |  | Softening Point | °C. | 85 | 85 | 85 | 85 | 85 |
| Nonwoven Fabric Sheet | Physical Properties | Basis Weight | g/m² | 14 | 14 | 33 | 35 | 18 |
|  |  | Thickness | mm | 78 | 78 | 150 | 155 | 95 |
|  |  | Bulk Density | g/cm³ | 0.179 | 0.179 | 0.220 | 0.226 | 0.189 |
|  |  | Tensile Strength | N/15 mm | 10.0 | 10.3 | 35.1 | 39.6 | 20.4 |
|  | Machinability | Heat Sealing Machine 1 | Defective Rate | 0.9 | 0.8 | 0.1 | 0.1 | 0.3 |
|  |  |  | Evaluation | appropriate | appropriate | appropriate | appropriate | appropriate |
|  |  |  | Sealing Strength | 12.9 | 13.1 | 17.5 | 17.4 | 16.7 |
|  |  | Heat Sealing Machine 2 | Defective Rate | 1.5 | 0.9 | 0.1 | 0.1 | 0.4 |
|  |  |  | Evaluation | inappropriate | appropriate | appropriate | appropriate | appropriate |
|  |  |  | Sealing Strength | 12.0 | 12.8 | 17.2 | 17.3 | 16.4 |
|  |  | Ultrasonic Sealing Machine | Defective Rate | 0.7 | 0.7 | 0.1 | 0.1 | 0.5 |
|  |  |  | Evaluation | appropriate | appropriate | appropriate | appropriate | appropriate |
|  |  |  | Sealing | 11.9 | 13.2 | 19.5 | 19.8 | 14.7 |
|  |  | Filling Suitability | Evaluation | no problem | no problem | no problem | no problem | no problem |
|  |  | Extraction performance | Evaluation | good | good | good | light | light |

|  |  |  |  | Sample 18 | Sample 19 | Sample 20 | Sample 21 |
|---|---|---|---|---|---|---|---|
| First Layer Spunbonded Nonwoven Fabric | Production Conditions | Basis Weight | g/m² | 12 | 12 | 12 | 12 |
|  |  | Fiber Diameter | μm | 10 | 25 | 40 | 42 |
|  | Physical Properties | IV Value |  | 0.71 | 0.71 | 0.71 | 0.71 |
|  |  | Crystallinity | % | 80 | 68 | 63 | 59 |
|  |  | Crystalline Orientation | % | 86 | 73 | 68 | 61 |
|  |  | Birefringence (Δn) |  | 0.08 | 0.07 | 0.06 | 0.04 |
| Second Layer Meltblown Nonwoven Fabric | Production Conditions | Basis Weight | g/m² | 6 | 6 | 6 | 6 |
|  |  | Air stream Temperature | °C. | 370 | 370 | 370 | 370 |
|  |  | DCD | mm | 30 | 30 | 30 | 30 |
|  | Physical Properties | Crystallinity | % | 3.0 | 3.0 | 3.0 | 3.0 |
|  |  | Softening Point | °C. | 85 | 85 | 85 | 85 |
| Nonwoven Fabric Sheet | Physical Properties | Basis Weight | g/m² | 18 | 18 | 18 | 18 |
|  |  | Thickness | mm | 100 | 105 | 115 | 115 |
|  |  | Bulk Density | g/cm³ | 0.174 | 0.171 | 0.156 | 0.156 |
|  |  | Tensile Strength | N/15 mm | 19.7 | 9.1 | 6.1 | 5.8 |
|  | Machinability | Heat Sealing Machine 1 | Defective Rate | 0.2 | 0.6 | 0.7 | 0.8 |
|  |  |  | Evaluation | appropriate | appropriate | appropriate | appropriate |
|  |  |  | Sealing Strength | 16.8 | 15.1 | 11.1. | 9.5 |
|  |  | Heat Sealing Machine 2 | Defective Rate | 0.1 | 0.7 | 0.9 | — |
|  |  |  | Evaluation | appropriate | appropriate | appropriate | inappropriate |
|  |  |  | Sealing Strength | 16.7 | 14.6 | 10.8 | — |

TABLE 3-continued

|  |  |  |  |  |  |  |
|---|---|---|---|---|---|---|
| | Ultrasonic | Defective Rate | 0.2 | 0.5 | 0.8 | 0.9 |
| | Sealing | Evaluation | appropriate | appropriate | appropriate | appropriate |
| | Machine | Sealing | 15.1 | 14.9 | 11.0 | 9.9 |
| | Filling Suitability | Evaluation | no problem | no problem | no problem | Problem found |
| | Extraction performance | Evaluation | good | good | good | good |

Evaluation results for each sample listed in Table 3 revealed that the nonwoven fabric sheets including the spunbonded nonwoven fabrics having a basis weight of 8.0 to 25.0 g/m² and a fiber diameter within the range of 10 to 40 μm had high machinability for each fast forming filling machine, and did not break the sealing parts in individually packaging extraction bags. Furthermore, it was demonstrated that the extraction bags had excellent extraction performance (Samples 14, 15, 18, 19, and 20).

In contrast, the nonwoven fabric sheets including the spunbonded nonwoven fabrics having a basis weight beyond the range of 8.0 to 25.0 g/m² or having a fiber diameter beyond the range of 10 to 40 μm had insufficient machinability for each fast forming filling machine, or the extraction bags made of such nonwoven fabric sheets had insufficient extraction performance (Samples 13, 16, 17 and 21).

Test Example 4

The meltblown nonwoven fabrics of the second layer formed by using the same resin to spin under the same conditions as in Example 1, and altering the basis weight in four stages from 1.8 to 11.0 g/m² as listed in Table 4 below were laminated onto the surface of the spunbonded nonwoven fabric of the first layer prepared under the same conditions as in the above-described Example 1, and samples of four nonwoven fabric sheets were prepared.

Evaluation results by the above-described respective tests conducted for the four resultant nonwoven fabric sheets of this example were listed in the columns "Sample 22" to "Sample 25" in Table 4 below.

TABLE 4

| | | | | Sample 22 | Sample 23 | Sample 24 | Sample 25 |
|---|---|---|---|---|---|---|---|
| First Layer Spunbonded Nonwoven Fabric | Production Conditions | Basis Weight | g/m² | 12 | 12 | 12 | 12 |
| | | Fiber Diameter | μm | 13.6 | 13.6 | 13.6 | 13.6 |
| | Physical Properties | IV Value | | 0.71 | 0.71 | 0.71 | 0.71 |
| | | Crystallinity | % | 71 | 71 | 71 | 71 |
| | | Crystalline Orientation | % | 85 | 85 | 85 | 85 |
| | | Birefringence (Δn) | | 0.08 | 0.08 | 0.08 | 0.08 |
| Second Layer Meltblown Nonwoven Fabric | Production Conditions | Basis Weight | g/m² | 1.8 | 2 | 10 | 11 |
| | | Air stream Temperature | °C. | 370 | 370 | 370 | 370 |
| | | DCD | mm | 30 | 30 | 30 | 30 |
| | | Post-processing | | no post-processing | no post-processing | no post-processing | no post-processing |
| | Physical Properties | Crystallinity | % | 3.0 | 3.0 | 3.0 | 3.0 |
| | | Softening Point | °C. | 85 | 85 | 85 | 85 |
| Nonwoven Fabric Sheet | Physical Properties | Basis Weight | g/m² | 13.8 | 14 | 22 | 23 |
| | | Thickness | mm | 95 | 95 | 105 | 105 |
| | | Bulk Density | g/cm³ | 0.145 | 0.147 | 0.209 | 0.21.9 |
| | | Tensile Strength | N/15 mm | 15.4 | 16.5 | 21.5 | 21.9 |
| | Machinability | Heat Sealing Machine 1 Defective Rate | | 0.9 | 0.7 | 0.2 | 0.2 |
| | | Evaluation | | appropriate | appropriate | appropriate | appropriate |
| | | Sealing Strength | | 8.5 | 9.2 | 17.9 | 17.8 |
| | | Heat Sealing Machine 2 Defective Rate | | 1.4 | 0.9 | 0.1 | 0.1 |
| | | Evaluation | | inappropriate | appropriate | appropriate | appropriate |
| | | Sealing Strength | | 7.8 | 8.4 | 17.5 | 17.6 |
| | | Ultrasonic Sealing Machine Defective Rate | | 0.9 | 0.8 | 0.2 | 0.1 |
| | | Evaluation | | appropriate | appropriate | appropriate | appropriate |
| | | Sealing Strength | | 6.5 | 8.0 | 18.2 | 18.5 |
| | | Filling Suitability Evaluation | | problem found | no problem | no problem | no problem |
| | | Extraction performance Evaluation | | good | good | good | light |

Evaluation results for each sample listed in Table 4 revealed that the nonwoven fabric sheets including the meltblown nonwoven fabrics having a basis weight within the range of 2.0 to 10.0 g/m² had high machinability for each fast forming filling machine, and did not break the sealing parts in individually packaging the extraction bags made of such nonwoven fabric sheets, and such extraction bags had excellent extraction performance (Samples 23 and 24).

Test Example 5

The bulk density of the nonwoven fabric sheets was altered as listed in Table 5 by using the same resin as in Example 1 and altering the distance between the spinneret and the surface of the spunbonded nonwoven fabric, or conducting calendering after laminating the meltblown nonwoven fabrics when the meltblown nonwoven fabrics of the second layer was laminated onto the surface of the spunbonded nonwoven fabric of the first layer prepared under the same conditions as in above-described Example 1, and samples of four nonwoven fabric sheets were prepared.

Evaluation results by the above-described respective tests conducted for the four resultant nonwoven fabric sheets of this example were listed in the columns "Sample 26" to "Sample 29" in Table 5 below.

TABLE 5

|  |  |  |  | Sample 26 | Sample 27 | Sample 28 | Sample 29 |
|---|---|---|---|---|---|---|---|
| First Layer Spunbonded Nonwoven Fabric | Production Conditions | Basis Weight | g/m² | 12 | 12 | 12 | 12 |
|  |  | Fiber Diameter | μm | 13.6 | 13.6 | 13.6 | 13.6 |
|  | Physical Properties | IV Value |  | 0.71 | 0.71 | 0.71 | 0.71 |
|  |  | Crystallinity | % | 71 | 71 | 71 | 71 |
|  |  | Crystalline Orientation | % | 85 | 85 | 85 | 85 |
|  |  | Birefringence (Δn) |  | 0.08 | 0.08 | 0.08 | 0.08 |
| Second Layer Meltblown Nonwoven Fabric | Production Conditions | Basis Weight | g/m² | 6 | 6 | 6 | 6 |
|  |  | Air stream Temperature | °C. | 370 | 370 | 370 | 370 |
|  |  | DCD | mm | 70 | 30 | 30 | 30 |
|  |  | Post-processing |  | no post-processing | calendering | calendering | calendering |
|  | Physical Properties | Crystallinity | % | 3.0 | 5.0 | 5.5 | 5.5 |
|  |  | Softening Point | °C. | 85 | 85 | 88 | 85 |
| Nonwoven Fabric Sheet | Physical Properties | Basis Weisht | g/m² | 18 | 18 | IS | 18 |
|  |  | Thickness | mm | 120 | 70 | 45 | 35 |
|  |  | Bulk Density | g/cm³ | 0.150 | 0.257 | 0.400 | 0.514 |
|  |  | Tensile Strength | N/15 mm | 16.2 | 18.6 | 18.4 | 14.9 |
|  | Machinability | Heat Sealing Machine 1 | Defective Rate | 0.4 | 0.5 | 0.7 | 0.9 |
|  |  |  | Evaluation | appropriate | appropriate | appropriate | appropriate |
|  |  |  | Sealing Strength | 15.7 | 15.7 | 15.8 | 15.2 |
|  |  | Heat Sealing Machine 2 | Defective Rate | 0.4 | 0.5 | 0.8 | 1.3 |
|  |  |  | Evaluation | appropriate | appropriate | appropriate | inappropriate |
|  |  |  | Sealing Strength | 15.5 | 15.4 | 15.6 | 14.9 |
|  |  | Ultrasonic Sealing Machine | Defective Rate | 0.6 | 0.4 | 0.S | 0.9 |
|  |  |  | Evaluation | appropriate | appropriate | appropriate | appropriate |
|  |  |  | Sealing Strength | 16.3 | 16.9 | 13.8 | 13.2 |
|  | Filling Suitability |  | Evaluation | no problem | no problem | no problem | problem found |
|  | Extraction performance |  | Evaluation | good | good | good | light |

Evaluation results for each sample listed in Table 5 revealed that the nonwoven fabric sheets having a bulk density within the range of 0.15 to 0.40 g/cm³ had high machinability for each fast forming filling machine, and did not break the sealing parts in individually packaging the extraction bags made of such nonwoven fabric sheets, and that such extraction bags had excellent extraction performance (Samples 26 to 28).

INDUSTRIAL APPLICABILITY

The nonwoven fabric sheet according to the present invention has high machinability for fast forming machines for use in the manufacture of extraction filters and extraction bags since the nonwoven fabric sheet can obtain high sealing strength in a short time. In addition, the resultant extraction filters have high sealing strength and thus hardly undergo damage. The nonwoven fabric sheet according to the present invention is therefore suitably used for the fields of extraction filters and extraction bags for beverage such as powder coffee, black tea, and green tea and for food such as kelp and dried bonito, and for the field of nonwoven fabric sheets, which are the materials of the extraction filters and bags.

REFERENCE SIGNS LIST 1 extraction filter
2 filter section
3 surface weld section
4 upper edge
5 extraction bag
6 bag body
7 linear weld section
8 string
9 tag

The invention claimed is:

1. A nonwoven fabric sheet comprising:
a first layer including a spunbonded nonwoven fabric formed from fibers of a polyester-based resin having an IV value of 0.60 to 1.00, a crystallinity of 30% to 80%, a crystalline orientation of 60% to 95%, and a birefringence (Δn) of 0.040 to 0.100 and provided with a partial thermocompression bonding section having a thermocompression bonding area rate of 5% to 30%; and
a second layer including a meltblown nonwoven fabric formed from fibers of a polyester-based resin blown onto a surface of the first layer and solidified, the polyester-based resin of the fibers forming the meltblown nonwoven fabric having a crystallinity of 0% to 14%.

2. The nonwoven fabric sheet according to claim 1, wherein:
the spunbonded nonwoven fabric has a basis weight of 8.0 to 25.0 g/m² and a fiber diameter of 10 to 40 μm;
the meltblown nonwoven fabric has a basis weight of 2.0 to 10.0 g/m²; and
the nonwoven fabric sheet has a bulk density of 0.15 to 0.40 g/cm³.

3. An extraction filter formed by employing the nonwoven fabric sheet according to claim 1, and sealing by welding the nonwoven fabric sheet at a predetermined location with the second layer of the nonwoven fabric sheet placed inside.

4. An extraction bag formed by employing the nonwoven fabric sheet according to claim 1, sealing by welding the nonwoven fabric sheet at a predetermined location with the second layer of the nonwoven fabric sheet placed inside to form a bag body in which an extraction material has been sealingly enclosed.

* * * * *